United States Patent
Aston et al.

(10) Patent No.: US 7,987,162 B2
(45) Date of Patent: Jul. 26, 2011

(54) DATA COMPRESSION IN A FILE STORAGE SYSTEM

(75) Inventors: Christopher J. Aston, Bucks (GB); Neil Berrington, San Jose, CA (US)

(73) Assignee: BlueArc UK Limited, Bracknell, Berkshire (GB)

( * ) Notice: Subject to any disclaimer, the term of this patent is extended or adjusted under 35 U.S.C. 154(b) by 340 days.

(21) Appl. No.: 12/399,604

(22) Filed: Mar. 6, 2009

(65) Prior Publication Data

US 2010/0228800 A1     Sep. 9, 2010

(51) Int. Cl.
G06F 17/30     (2006.01)

(52) U.S. Cl. ......... 707/693; 707/823; 707/829; 709/203

(58) Field of Classification Search ................. 707/693, 707/823, 829; 709/203
See application file for complete search history.

(56) References Cited

U.S. PATENT DOCUMENTS

| | | | |
|---|---|---|---|
| 5,305,295 A | 4/1994 | Chu | 369/30 |
| 5,991,542 A | 11/1999 | Han et al. | 395/712 |
| 7,536,418 B2 * | 5/2009 | Buchsbaum et al. | 1/1 |
| 2003/0218554 A1 | 11/2003 | McGuire | 341/65 |
| 2008/0307014 A1 * | 12/2008 | Patil | 707/204 |
| 2009/0012982 A1 * | 1/2009 | Merchia et al. | 707/101 |

FOREIGN PATENT DOCUMENTS

| | | |
|---|---|---|
| EP | 0798656 | 10/1997 |
| WO | WO 2007138600 A2 * | 12/2007 |
| WO | WO 2007138603 A2 * | 12/2007 |

OTHER PUBLICATIONS

International Searching Authority, International Search Report—International Application No. PCT/US2010/026323, dated May 31, 2010, together with the Written Opinion of the International Searching Authority, 9 pages.

* cited by examiner

Primary Examiner — Cheryl Lewis
(74) Attorney, Agent, or Firm — Sunstein Kann Murphy & Timbers LLP

(57) ABSTRACT

Embodiments of the present invention provide for compression of files in a filesystem. In embodiments of the present invention, a file is logically partitioned into chunks and each chunk is compressed, such that a request involving a portion of a file can be satisfied by reading and decompressing only the compressed chunk(s) corresponding to that portion.

22 Claims, 11 Drawing Sheets

DATA COMPRESSION IN A FILE STORAGE SYSTEM

CROSS-REFERENCE TO RELATED APPLICATIONS

The present invention may be related to one or more of the following United States patent applications, each of which is hereby incorporated herein by reference in its entirety:

U.S. patent application Ser. No. 09/879,798 entitled Apparatus and Method for Hardware Implementation or Acceleration of Operating System Functions, which was filed Jun. 12, 2001, now U.S. Pat. No. 6,826,615;

U.S. patent application Ser. No. 10/889,158 entitled Apparatus and Method for Hardware Implementation or Acceleration of Operating System Functions, which was filed on Jul. 12, 2004;

U.S. patent application Ser. No. 10/286,015 entitled Apparatus and Method for Hardware-Based File System, which was filed on Nov. 1, 2002, U.S. Pat. No. 7,457,822, in the name of Geoffrey S. Barrall et al. ; and U.S. patent application Ser. No. 11/841,353 entitled Apparatus and Method for Hardware-Based File System, which was filed on Aug. 20, 2007 in the name of Geoffrey S. Barrall et al.

FIELD OF THE INVENTION

The present invention relates to file storage systems, and in particular to compression of files in a filesystem.

BACKGROUND

Data compression is often used in file storage systems to reduce the amount of storage space needed to store certain files. Data compression may be particularly beneficial for files that are not accessed frequently. Such "inactive" files may be compressed and the compressed files archived, for example, in a secondary storage. Generally speaking, in order to read or write a portion of a compressed file, the entire compressed file must be read from storage and decompressed to recover the original file data. Such decompression can be time-consuming and can increase the processing load of the storage system.

SUMMARY OF THE INVENTION

Embodiments of the present invention logically partition a file into chunks and compress each chunk separately, such that a request involving a portion of a file can be satisfied by reading and decompressing only the compressed chunk(s) corresponding to that portion.

In accordance with one aspect of the present invention there is provided a method for storing a file by a file server in a file storage system, wherein the file is logically partitioned into chunks. The method involves compressing each chunk to form a corresponding compressed chunk, forming a compressed file including the compressed chunks, storing the compressed file in the file storage system, maintaining mapping metadata for the compressed file, the mapping metadata mapping portions of the original file to corresponding compressed chunks in the compressed file.

A non-compressed file may be divided into chunks, and the chunks may be nominally fixed-size chunks (e.g., the last chunk for an existing file may have less than a full chunk's worth of data). Additionally or alternatively, each write request for the file may be treated as a separate chunk. The mapping metadata may map each chunk to its corresponding compressed chunk or may map fixed-size ranges of the file to corresponding compressed chunks in the compressed file.

Mapping metadata may be maintained within the compressed file, e.g., by maintaining at least one map within the compressed file. Mapping metadata may be maintained within a root node of the compressed file and/or elsewhere within the compressed file. Additionally or alternatively, each compressed chunk may include a header, and mapping metadata may be maintained within the headers (e.g., including within each header a pointer to a sequentially next compressed chunk in the compressed file).

Mapping metadata additionally or alternatively may be maintained in a map file separate from the compressed file, in which case a reference to the map file may be maintained within the compressed file (e.g., within a root node of the compressed file).

Compression metadata, such as a compression type for the compressed file, a compression type for each compressed chunk of the compressed file, a size for each chunk; a size for each compressed chunk, or an indicator for each compressed chunk indicating whether the compressed chunk contains compressed or uncompressed data may be maintained for the compressed file, for example, within a root node of the compressed file, within a map, and/or within headers.

In additional embodiments, upon receiving a request relating to a portion of the original file, the method further involves identifying at least one compressed chunk associated with the portion of the original file using the map information, retrieving each identified compressed chunk from the compressed file, decompressing each retrieved compressed chunk sufficiently to recover original data associated with the portion, and satisfying the request using the recovered original data.

Decompressing each retrieved compressed chunk sufficiently to recover original data associated with the portion may involve terminating decompression of a compressed chunk upon recovering a sufficient amount of original data for satisfying the request.

The method may further involve, when satisfying the request results in a modified chunk, compressing the modified chunk to form a modified compressed chunk, storing the modified compressed chunk as part of the compressed file, and updating the mapping metadata to include the modified compressed chunk. Storing the modified compressed chunk as part of the compressed file may involve, when the size of the modified compressed chunk is less than or equal to the size of the corresponding compressed chunk retrieved from the compressed file, inserting the modified compressed chunk into the compressed file in place of the compressed chunk, and when the size of the modified compressed chunk is greater than the size of the corresponding compressed chunk retrieved from the compressed file, inserting the modified compressed chunk elsewhere in the compressed file.

Over time, the compressed file may come to include unused space. This unused space may be recovered from time to time, for example, by decompressing the compressed file and recompressing it without the unused spaces.

BRIEF DESCRIPTION OF THE DRAWINGS

The foregoing features of the invention will be more readily understood by reference to the following detailed description, taken with reference to the accompanying drawings, in which.

DETAILED DESCRIPTION OF SPECIFIC EMBODIMENTS

Figure 1:
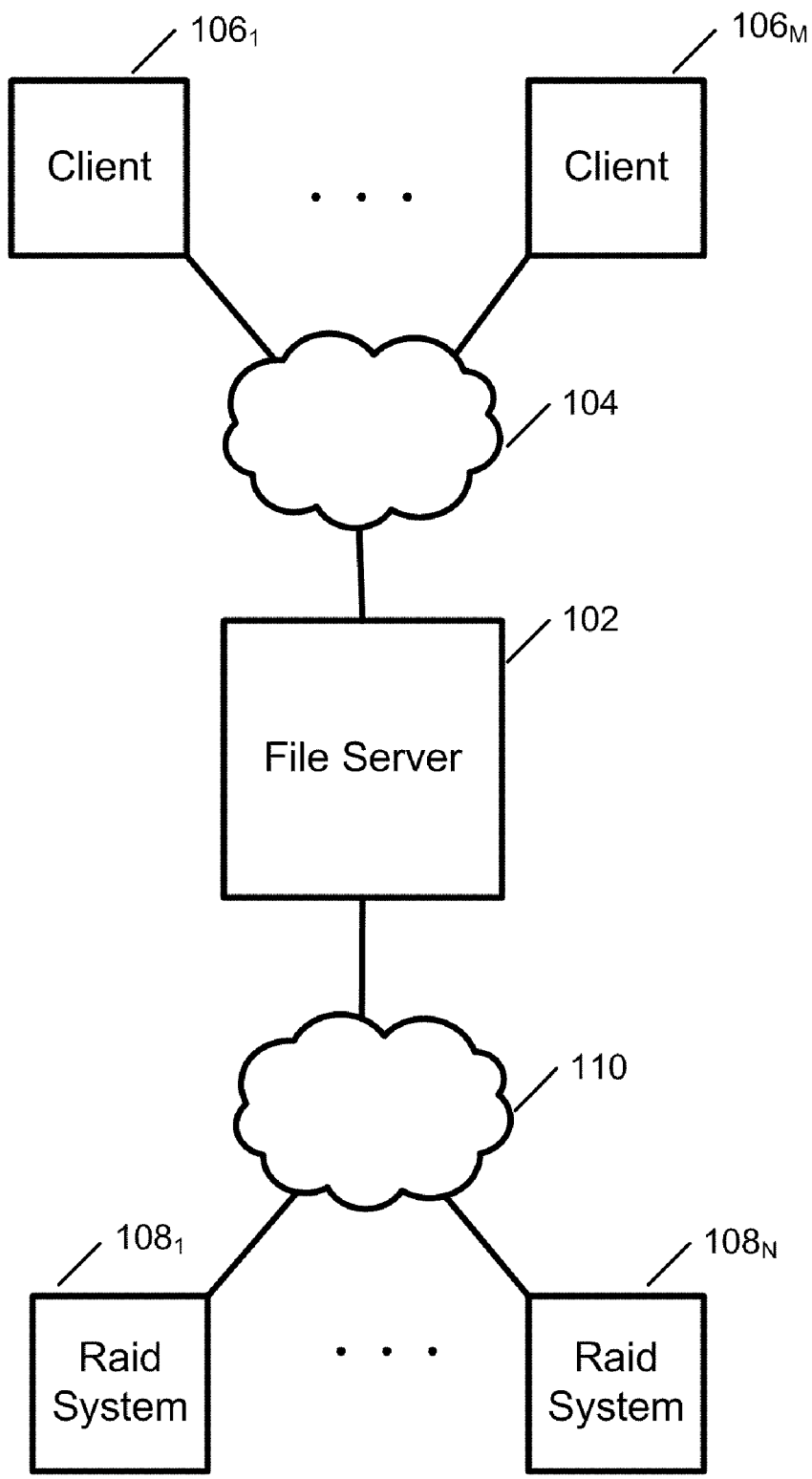
FIG. 1 is a schematic block diagram of a network-attached file storage system in accordance with an exemplary embodiment of the present invention.

As used in this description and the accompanying claims, the following terms shall have the meanings indicated, unless the context otherwise requires:

A "storage device" is a device or system that is used to store data. A storage device may include one or more magnetic or magneto-optical or optical disk drives, solid state storage devices, or magnetic tapes. For convenience, a storage device is sometimes referred to as a "disk" or a "hard disk." A data storage system may include the same or different types of storage devices having the same or different storage capacities.

A "RAID controller" is a device or system that combines the storage capacity of several storage devices into a virtual piece of storage space that may be referred to alternatively as a "system drive" ("SD"), a "logical unit" ("LU" or "LUN"), or a "volume." Typically, an SD is larger than a single storage device, drawing space from several storage devices, and includes redundant information so that it can withstand the failure of a certain number of disks without data loss. In exemplary embodiments, each SD is associated with a unique identifier that is referred to hereinafter as a "logical unit identifier" or "LUID," and each SD will be no larger than a predetermined maximum size, e.g., 2 TB-64 TB or more. When commands are sent to an SD, the RAID controller typically forwards the commands to all storage devices of the SD at the same time. The RAID controller helps to overcome three of the main limitations of typical storage devices, namely that the storage devices are typically the slowest components of the storage system, they are typically the most likely to suffer catastrophic failure, and they typically have relatively small storage capacity.

A "RAID system" is a device or system that includes one or more RAID controllers and a number of storage devices. Typically, a RAID system will contain two RAID controllers (so that one can keep working if the other fails, and also to share the load while both are healthy) and a few dozen storage devices. In exemplary embodiments, the RAID system is typically configured with between two and thirty-two SDs. When a file server needs to store or retrieve data, it sends commands to the RAID controllers of the RAID system, which in turn are responsible for routing commands onwards to individual storage devices and storing or retrieving the data as necessary. With some RAID systems, mirror relationships can be established between SDs such that data written to one SD (referred to as the "primary SD") is automatically written by the RAID system to another SD (referred to herein as the "secondary SD" or "mirror SD") for redundancy purposes. The secondary SD may be managed by the same RAID system as the primary SD or by a different local or remote RAID system. Mirroring SDs effectively provides RAID 1+0 functionality across SDs in order to provide recovery from the loss or corruption of an SD or possibly even multiple SDs in some situations.

A "filesystem" is a structure of files and directories (folders) stored in a file storage system. Within a file storage system, filesystems are typically managed using a number of virtual storage constructs, and in exemplary embodiments, filesystems are managed using a hierarchy of virtual storage constructs referred to as ranges, stripesets, and spans. A "range" is composed of either a primary SD on its own or a primary/secondary SD pair that are supposed to contain identical data and therefore offer the same storage capacity as a single SD. A "stripeset" is composed of one or more ranges. A "span" is composed of one or more stripesets. Thus, a span is ultimately composed of one or more SDs (typically four to fifty SDs). A span can be divided into one or more filesystems, with each filesystem having a separate name and identifier and potentially different characteristics (e.g., one filesystem may be formatted with 32 KB clusters and another with 4 KB clusters, one filesystem may be Worm and another not, etc.). Each filesystem on the span is formatted, mounted, and unmounted separately. Filesystems may be created and deleted in any order and at any time. Filesystems can be configured to expand automatically (or alternatively to prevent or restrict auto-expansion) or can be expanded manually.

A "set" of values may include one or more values.

A "file server" is a device that manages storage of files in a file storage system.

Embodiments of the present invention provide for compression of files in a filesystem. A file is stored in discrete pieces (referred to hereinafter as "chunks"), with each chunk compressed separately, such that a request involving a portion of a file can be satisfied by reading and decompressing only the compressed chunk(s) corresponding to that portion. Such a file compression scheme may be particularly useful for compressing active files in a live filesystem, although it also may be useful generally for storage/archiving of files.

Embodiments of the present invention may be used in various types of storage systems, including direct and network-attached storage systems. FIG. 1 is a schematic block diagram of a network-attached file storage system in accordance with an exemplary embodiment of the present invention. Among other things, the file storage system includes a number of file servers (a single file server 102 is shown for the sake of simplicity and convenience) in communication with various client devices $106_1$-$106_M$ over a communication network 104 such as an Internet Protocol network (e.g., the Internet) and also in communication with various RAID systems $108_1$-$108_N$ over a storage network 110 such as a Fibre-Channel network. The client devices $106_1$-$106_M$ and the file server 102 communicate using one or more network file protocols, such as CIFS and/or NFS. The file server 102 and the RAID systems $108_1$-$108_N$ communicate using a storage protocol, such as SCSI. It should be noted that the file storage system could include multiple file servers and multiple RAID systems interconnected in various configurations, including a full mesh configuration in which any file server can communicate with any RAID system over a redundant and switched FibreChannel network.

The file server 102 includes a storage processor for managing one or more filesystems. The file server 102 can be configured to allow client access to portions of the filesystems, such as trees or sub-trees under designated names. In CIFS parlance, such access may be referred to as a "share" while in NFS parlance, such access may be referred to as an "export." Internally, the file server 102 may include various hardware-implemented and/or hardware-accelerated subsystems, for example, as described in U.S. patent application Ser. No. 09/879,798, U.S. Pat. No. 6,826,615, and Ser. No.10/ 889,158, which were incorporated by reference above, and may include a hardware-based filesystem including a plurality of linked sub-modules, for example, as described in U.S. patent application Ser. No. 10/286,015, U.S. Pat. No. 7,457, 822 and Ser. No. 11/841,353, which were incorporated by reference above.

Each RAID system 108 typically includes at least one RAID controller (and usually two RAID controllers for redundancy) as well as a number of physical storage devices (e.g., disks) that are managed by the RAID controller(s). The RAID system 108 aggregates its storage resources into a number of SDs. For example, each RAID system 108 may be configured with between 2 and 32 SDs. Each SD may be limited to a predetermined maximum size (e.g., 2 TB-64 TB or more). Combining several storage devices into an SD can provide a number of benefits, including increased speed (individual storage devices are relatively slow, but data can be striped across several storage devices to widen the bottleneck), increased capacity (individual storage devices are comparatively small, but several storage devices can be combined to provide more usable space), abstraction (the amount of space used can be either larger or smaller than the size of a single storage device), and resilience (parity or redundancy information can be stored on each storage device so that the SD can withstand the loss of a storage device).

The file server 102 is configured to use one or more SDs, which can be from a single RAID system or from multiple RAID systems. The file server 102 can normally interrogate the RAID systems to find out whether each SD is primary or secondary. The method of controlling which SDs are used by the file server 102 is referred to herein as "licensing." Thus, in practice, the file server 102 will typically be licensed for some SDs and unlicensed for others.

Internally, the file server 102 is capable of combining several SDs into a larger storage pool referred to herein as a "span." A span is essentially a RAID 0 array of several SDs. Combining several SDs into a span can provide a number of benefits similar to those obtained by combining multiple physical disks into an SD, including increased speed (spreading I/O between multiple SDs on multiple RAID systems can widen the storage bottleneck further), increased storage capacity (the span can be larger than a single SD, which may be limited to two terabytes), and additional abstraction, which allows for more flexible storage space allocation.

The file server 102 stores various types of objects in the filesystem. The objects may be classified generally as system objects and file objects. File objects are created for storage of user data and associated attributes, and may include such things as word processor or spreadsheet files. System objects are created by the file storage system for managing information.

Figure 2:
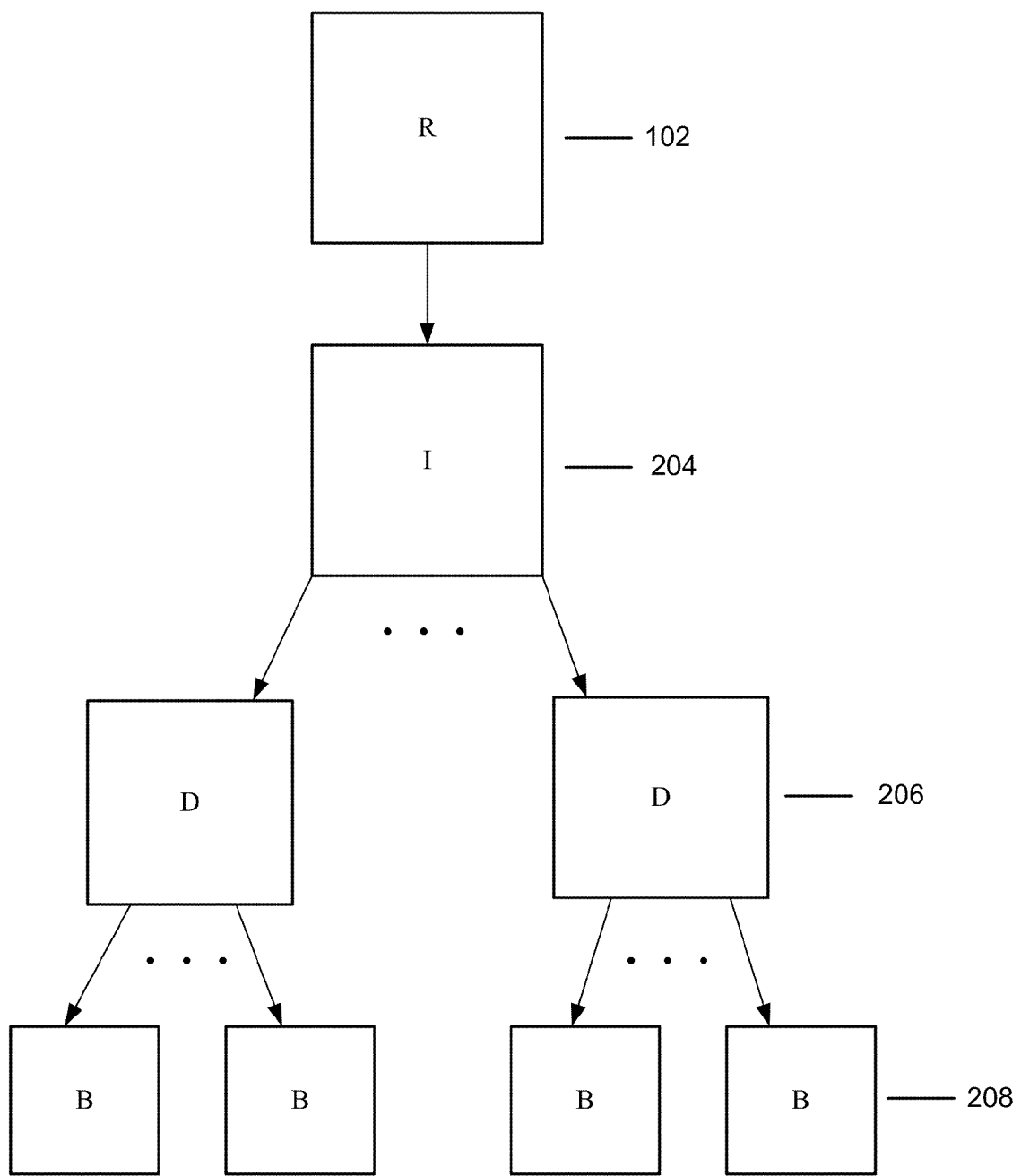
FIG. 2 is a schematic block diagram showing the general format of an object tree structure in accordance with an exemplary embodiment of the present invention.

Generally speaking, each object in the filesystem, including each of the system objects and each of the file objects, is implemented using a separate tree structure that includes a separate object root node and optionally includes a number of indirect nodes, direct nodes, and storage blocks. FIG. 2 is a schematic block diagram showing the general format of an object tree structure in accordance with an exemplary embodiment of the present invention. A root ("R") node 202 may point to various indirect ("I") nodes 204, each of which may point to a number of direct ("D") nodes 206, each of which may point to a number of storage blocks ("B") 208. In practice, object tree structures can vary widely, for example, depending on the size of the object. Also, the tree structure of a particular object can vary over time as information is added to and deleted from the object. For example, nodes may be dynamically added to the tree structure as more storage space is used for the object, and different levels of indirection may be used as needed (e.g., an indirect node can point to direct nodes or to other indirect nodes). As data is deleted from the object and data blocks and direct and indirect nodes are no longer required, they are returned to free space.

Generally speaking, in order to store a file in compressed form, the file is logically partitioned into chunks, each chunk is compressed using a predetermined data compression scheme to form a corresponding compressed chunk, and the compressed chunks are packed together to form a compressed file. The file may be logically partitioned into chunks explicitly, for example, by logically dividing an existing file into mainly fixed-size chunks (the last chunk of the file may be smaller if the file size is not an integer multiple of the chunk size), and/or implicitly, for example, by treating write requests (which may be of varying sizes) as a separate chunks. In certain embodiments, if the compressed file is smaller than the original file, then the compressed file is stored in the storage system, and otherwise (i.e., the compressed file is larger than the original file, which is generally possible with most data compression schemes depending on the type of data and other factors) the original file is stored uncompressed in the storage system instead of the compressed file. In other embodiments, certain classes of files may be compressed and stored in compressed form regardless of whether the compressed file is larger or smaller than the original file. Each file may include an indicator (e.g., in the file root node) to indicate whether the file is compressed or uncompressed.

As discussed above, with such a compressed file, a request involving a portion of a file can be satisfied by reading and decompressing only the compressed chunk(s) corresponding to that portion. In order to support such functionality, information that directly or indirectly maps each chunk of the original file to its corresponding compressed chunk within the compressed file (referred to hereinafter as "mapping metadata") is maintained for the compressed file. In certain embodiments, mapping metadata is maintained using a table or other appropriate logic construct (referred to hereinafter as the "map"). Such a map may be stored, for example, within the compressed file itself (e.g., within the file root node and/or within data blocks) or as a separate file. Additionally or alternatively, mapping metadata may be maintained within headers that are included in the compressed chunks. Each such header may include a link to the header of the "next" compressed chunk within the compressed file (i.e., forming a linked list of compressed chunks), such that a particular compressed chunk can be located by traversing the linked list based on the links contained within the compressed chunk headers.

In some embodiments, maps may be maintained for every compressed file. Alternatively, headers could be used with or without a map. Using headers without a map would generally be acceptable for files that are small and/or generally read and written sequentially. For large files and/or files that are generally accessed randomly, however, it could be very expensive to traverse the linked list to find a specific chunk, because each header read may (and perhaps is likely to) require a separate disk access (and disk response time). In this case, a separate map is generally preferred because the map allows mapping information for many compressed chunks to be loaded at once. While the map may be embodied as a table structure, another possibility is for the map to include a more complex data structure for quickly and efficiently mapping original file offset to chunk location (which would make it easier to find the necessary chunk, at the cost of additional complexity in maintaining the additional data structure).

Other information (referred to hereinafter as "compression metadata") is typically stored for each compressed chunk and may include such things as the size of the original chunk, the size of the compressed chunk, a "flag" indicating whether the compressed chunk includes compressed or original data, and/or a compression type indicator. Such compression metadata may be stored, for example, in the map or in headers included in each compressed chunk.

In typical embodiments, a single data compression scheme is used for all files, but in alternative embodiments, different data compression schemes may be used for different types of files (e.g., based on file content, file extension, or other file attribute) and/or for different chunks within a file (e.g., based on chunk contents or other chunk attribute). If multiple data compression schemes are applied at the file level, then a compression type indicator typically would be stored for each compressed file (e.g., in the file root node). If multiple data compression schemes are applied at the chunk level, then a compression type indicator typically would be stored for each compressed chunk (e.g., in a map table or in a header included in each compressed chunk, as discussed below). For the sake of simplicity, the exemplary embodiments described below assume a single data compression scheme is used for all files and chunks, such that there is no need to store a compression type indicator for files or chunks.

As discussed above, each chunk is compressed using a data compression scheme. Data compression schemes typically include mechanisms to avoid data expansion, for example, by reverting to the original data when the "compressed" data is larger than the original data. Thus, in typical embodiments of the present invention, a compressed chunk may include compressed (encoded) data or original (unencoded) data in accordance with the data compression scheme and therefore the compressed file may include some compressed chunks containing compressed data and some compressed chunks containing original data. Thus, in this respect, a compressed chunk is not necessarily smaller than the original chunk and may be larger than the original chunk, for example, if the data compression scheme does not include an expansion avoidance mechanism or if each compressed chunk includes a header as discussed below (in which case even a compressed chunk that includes original data may be larger than the original chunk).

Figure 3:
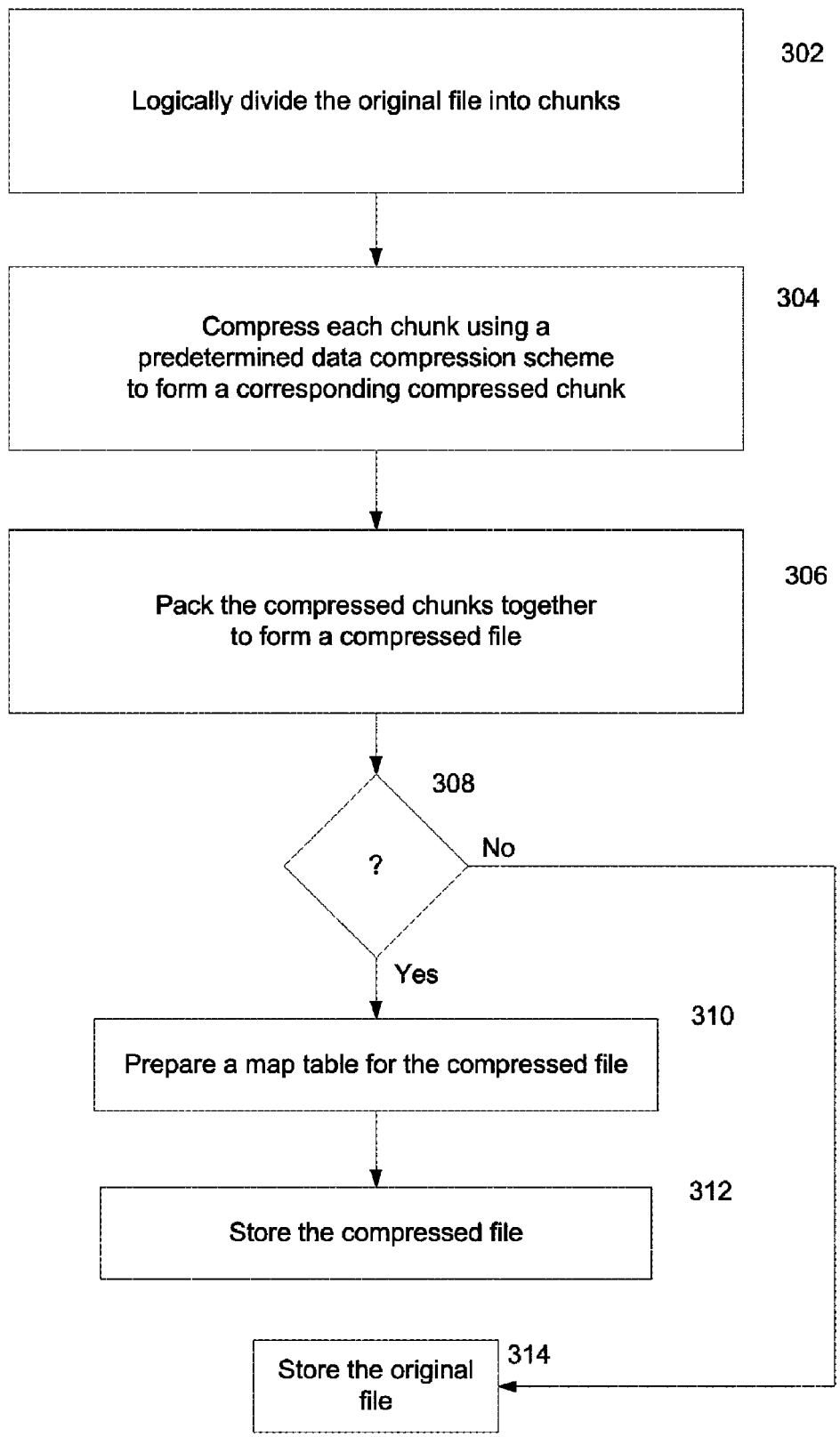
FIG. 3 is a logic flow diagram for compressing a file in accordance with an exemplary embodiment of the present invention.

FIG. 3 is a logic flow diagram for compressing an existing file in accordance with an exemplary embodiment of the present invention. In block 302, the original file is logically divided into chunks. In block 304, each chunk is compressed using a predetermined data compression scheme to form a corresponding compressed chunk. In block 306, the compressed chunks are packed to form a compressed file. If the compressed file is smaller than the original file (YES in block 308), then a map is prepared for the compressed file, in block 310, and the compressed file is stored, in block 312; otherwise (NO in block 308), the original file is stored, in block 314.

Figure 4:
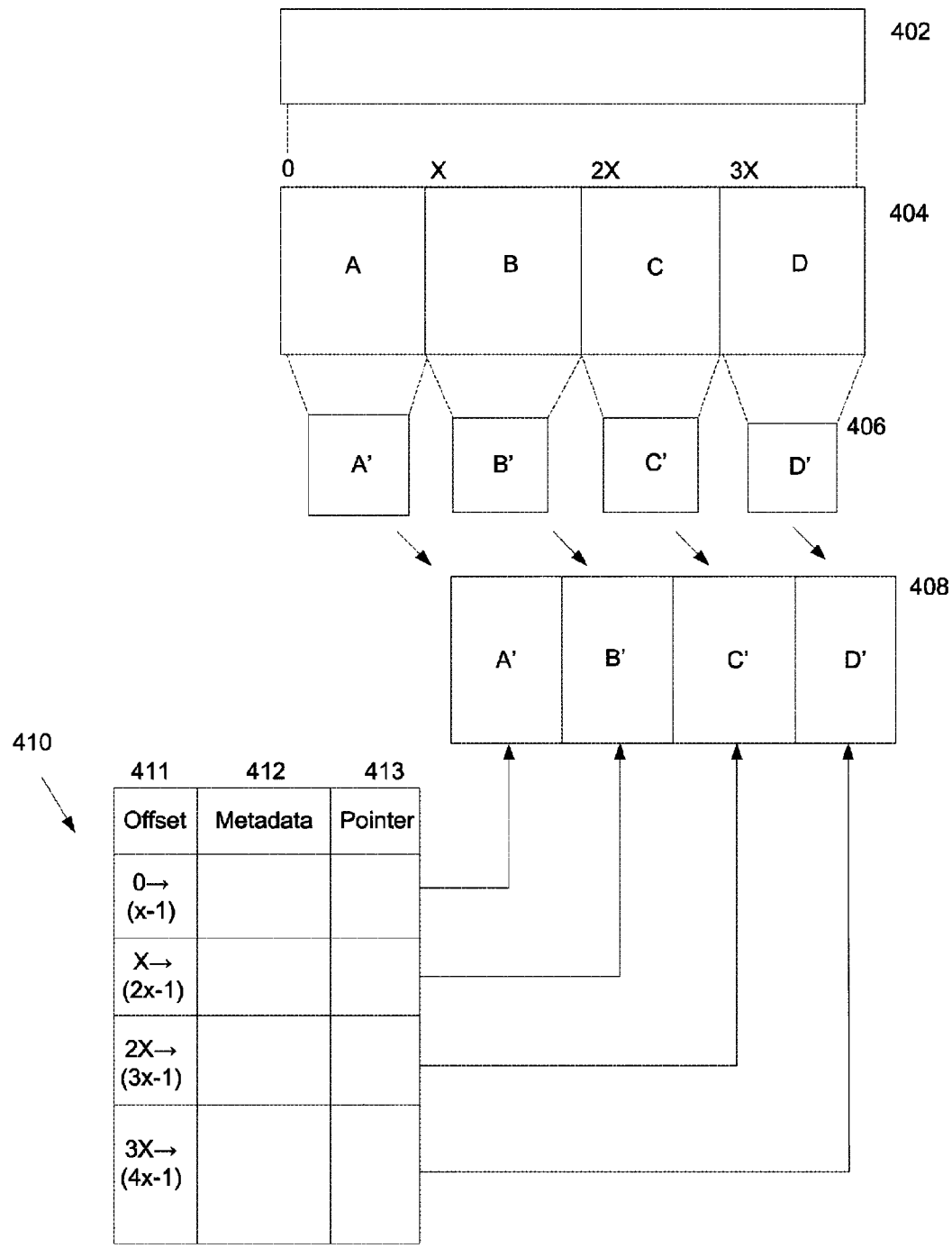
FIG. 4 is a schematic diagram showing the relationship between the original file, chunks, compressed chunks, compressed file, and map, in accordance with an exemplary embodiment of the present invention.

FIG. 4 is a schematic diagram showing the relationship between the original file, chunks, compressed chunks, compressed file, and map, in accordance with an exemplary embodiment of the present invention. As discussed above, the original file 402 is logically divided into chunks 404. In this example, the chunks 404 are fixed-size chunks of X bytes each (e.g., 4K or 64K bytes), although it should be noted that the last chunk in the file may include fewer than X bytes). The chunks 404 are individually compressed into compressed chunks 406, which are then packed together to form a compressed file 408. The map 410 maps each chunk 404 from the original file (e.g., a "range" 411 indicating the file offsets associated with the chunk relative to the start of the original file) to the corresponding compressed chunk within the compressed file 408 (e.g., a "pointer" 413 indicating the relative offset from the start of the compressed file to the start of the compressed chunk). The map 410 may also include compression metadata 412 for each compressed chunk, such as the size of the original chunk, the size of the compressed chunk, and a "flag" indicating whether the compressed chunk includes compressed or original data.

Figure 5:
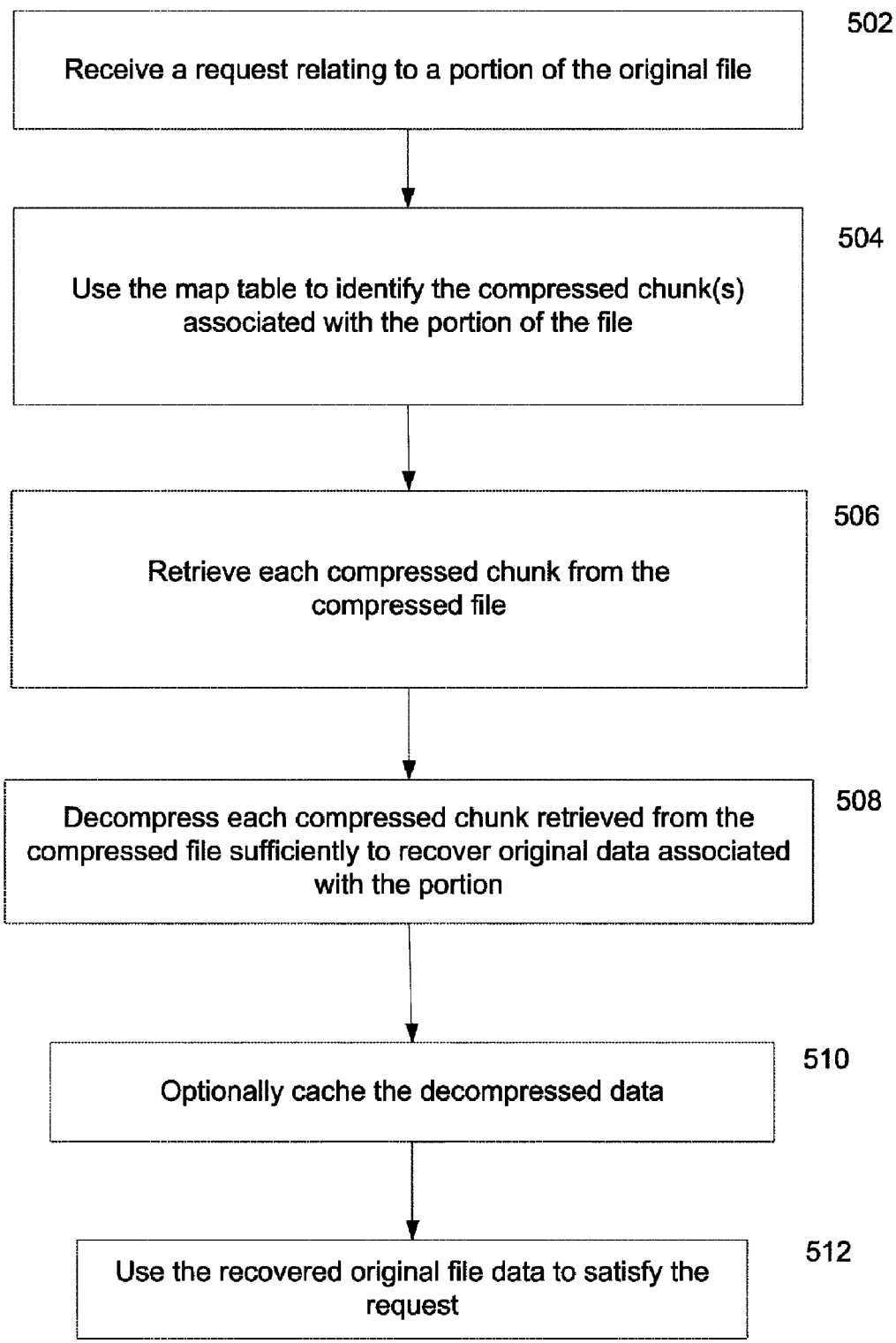
FIG. 5 is a logic flow diagram for processing a request relating to the original file, in accordance with an exemplary embodiment of the present invention.

FIG. 5 is a logic flow diagram for processing a request relating to the original file, in accordance with an exemplary embodiment of the present invention. Upon receipt of a request relating to a portion of the original file, in block 502, the map is used to identify the compressed chunk(s) associated with the portion of the file, in block 504 (e.g., based on offsets associated with the portion relative to the start of the original file). Each such compressed chunk is retrieved from storage, in block 506, and decompressed sufficiently to recover original file data associated with the portion, in block 508. Specifically, if the compressed chunk contains compressed data (as indicated by the compression metadata for the compressed chunk), then the compressed data is decompressed at least enough to recover the original data associated with the portion (i.e., after a sufficient amount of original data has been recovered from a compressed chunk, the request may be satisfied without decompressing the remainder of the compressed chunk, although it may be desirable to decompress the entire compressed chunk, for example, to cache the decompressed data as discussed below); otherwise, the compressed chunk already contains the original data for the chunk. In any case, the decompressed data may be cached, in block 510, so that it is available for later requests. The request is then satisfied using the recovered original file data, in block 512.

For one example, assume that a request is received for a portion of the original file of FIG. 3 between file offsets 2X and (3X−1) exclusive (i.e., encompassing original file data wholly within original chunk C). Based on the map table, compressed chunk C' is retrieved from the compressed file and is decompressed to recover the original data from chunk C. Specifically, if the metadata indicates that compressed chunk C' contains compressed data, then the compressed chunk is decompressed at least enough to recover the portion; otherwise, the compressed chunk already contains the original data for the chunk, so no decompression is performed. The request is then satisfied using the recovered portion.

For another example, assume that a request is received for a portion of the original file of FIG. 3 between file offsets (2X+y) and (3X+y) inclusive, where 0<y<X (i.e., encompassing original file data spanning parts of chunks C and D). Based on the map table, compressed chunks C' and D' are retrieved from the compressed file. Compressed chunk C' is decompressed to recover original file data within the range (2X+y) to (3X−1) inclusive (which typically involves decompression of the entire compressed chunk), and at least enough of compressed chunk D' (and usually the entire compressed chunk) is decompressed to recover original file data within the range 3X to (3X+y) inclusive. The request is then satisfied using the recovered portion.

Figure 6:
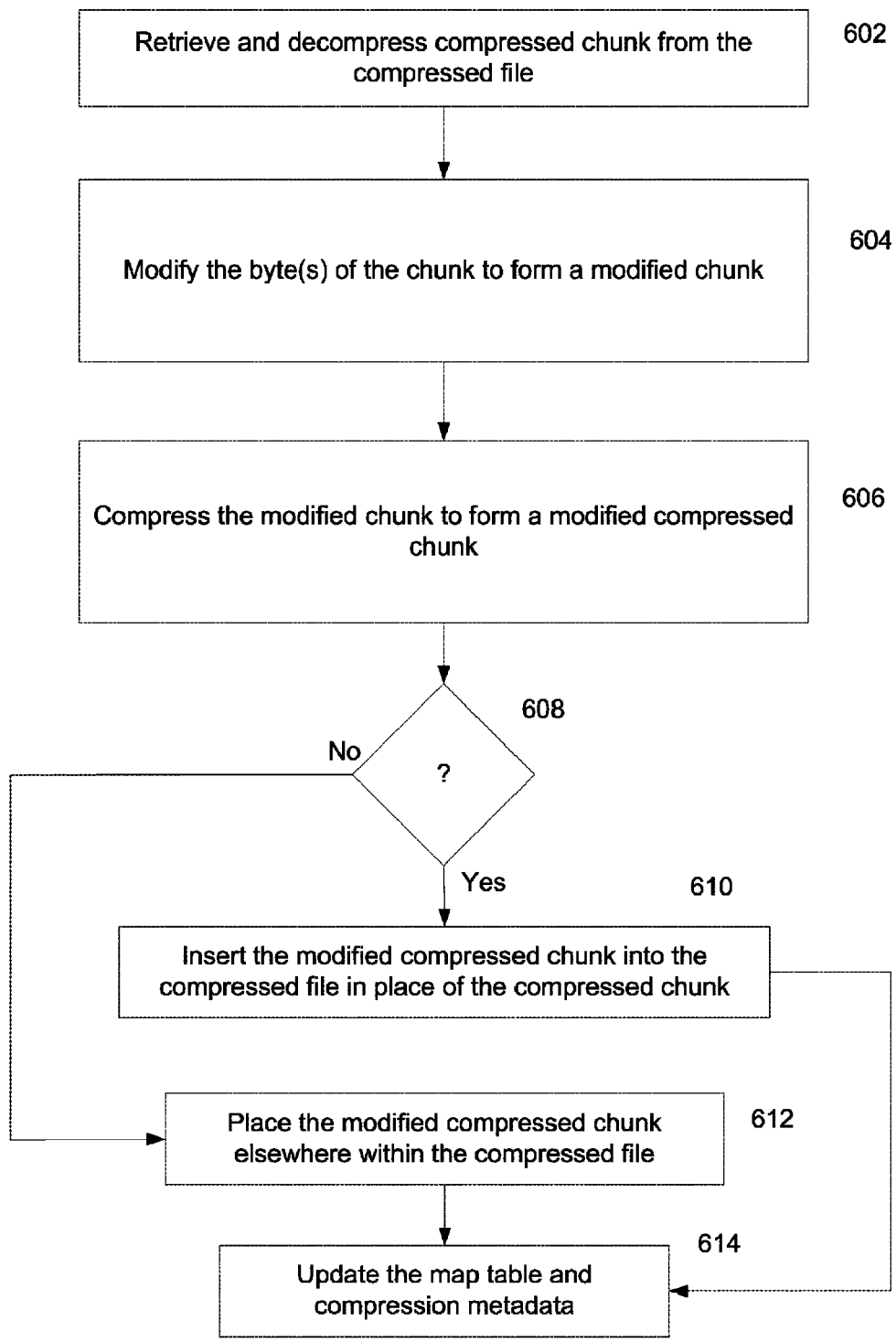
FIG. 6 is a logic flow diagram for processing a request that involves modification of one or more bytes within a particular chunk, in accordance with an exemplary embodiment of the present invention.

FIG. 6 is a logic flow diagram for processing a request that involves modification of one or more bytes within a particular chunk, in accordance with an exemplary embodiment of the present invention. After retrieving and decompressing the corresponding compressed chunk from the compressed file, in block 602, the byte(s) of the chunk are modified, in block 604, and the modified chunk is compressed to form a modified compressed chunk, in block 606. Because of the modification, the size of the modified compressed chunk may be larger or smaller than the size of the compressed chunk retrieved from the compressed file. If the size of the modified compressed chunk is less than or equal to the size of the compressed chunk retrieved from the compressed file (YES in block 608), then the modified compressed chunk can be inserted into the compressed file in place of the compressed chunk, in block 610. If, on the other hand, the size of the modified compressed chunk is greater than the size of the compressed chunk retrieved from the compressed file (NO in block 608), such that the modified compressed chunk will not fit within the space occupied by the compressed chunk, then the modified compressed chunk is placed elsewhere within the compressed file, in block 612, for example, at the end of the compressed file. The map and compression metadata are updated as needed to reflect changes to the compressed file, in block 614. For example, the map may be updated to reflect the location of the modified compressed chunk within the compressed file (e.g., at the end of the compressed file), and the compression metadata may be updated to reflect the size of the modified compressed chunk.

Figure 7:
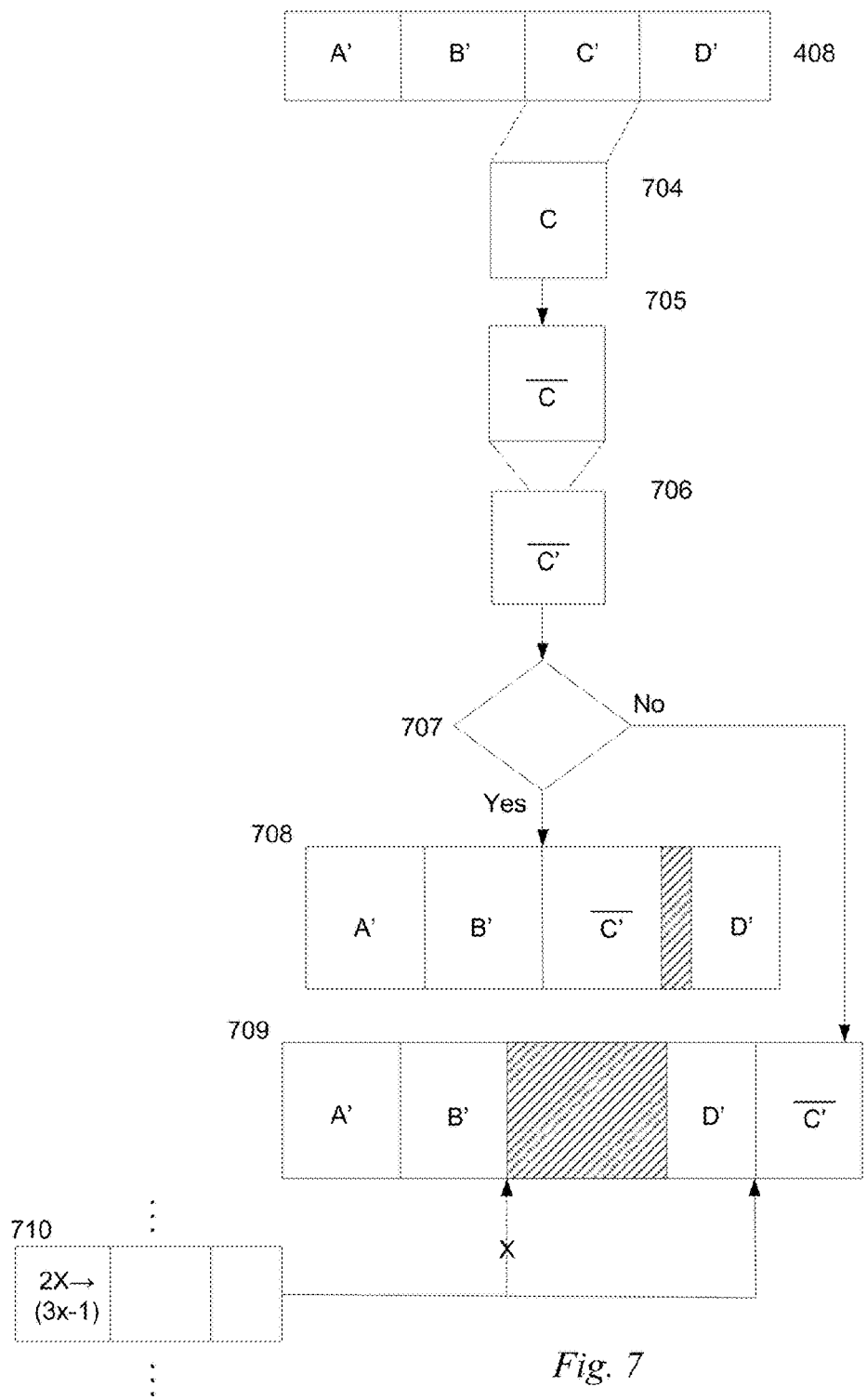
FIG. 7 is a schematic diagram showing modification of a compressed file, in accordance with an exemplary embodiment of the present invention.

For example, assume now that the request involves modifying a byte within chunk C. As shown in FIG. 7, based on the map table, compressed chunk C' is retrieved from the compressed file 408 and is decompressed to recover the original data 704 for chunk C. Then, the byte in chunk C is modified to form a modified chunk $\overline{C}$ 705. Modified chunk $\overline{C}$ 705 is compressed to form modified compressed chunk $\overline{C'}$ 706. If the size of modified compressed chunk $\overline{C'}$ 706 is less than or equal to the size of compressed chunk C' (YES in block 707), then the modified compressed chunk $\overline{C'}$ 706 can be inserted into the compressed file in place of compressed chunk C' to result in the compressed file 708 (which may include some unused space between the end of modified compressed chunk $\overline{C'}$ 706 and the beginning of compressed chunk D', as indicated by the hatching). If, on the other hand, the size of modified compressed chunk $\overline{C'}$ 706 is greater than the size of compressed chunk C' (NO in block 707), then the modified compressed chunk $\overline{C'}$ 706 is inserted at the end of the compressed file to result in the compressed file 709, and the map is updated accordingly to result in map 710.

It should be noted that in compressed file 709, the space previously occupied by compressed block C' is unused. This unused space later may be used to store additional compressed data as discussed below or may be recovered, for example, by decompressing the entire file at an appropriate time (e.g., when the load on the system is low, using a background task to limit the amount of impact to the system) and recompressing the file as discussed with reference to FIG. 3 so that the compressed chunks are packed in-order into the recompressed file.

As new data is added to the end of the original file (either in a single write or in a series of writes), the new data may be stored uncompressed in the compressed file for some time and/or may be compressed at an appropriate time (e.g., at each write, when the new data reaches the size of a complete chunk, or at a checkpoint or other appropriate time) for storage in the compressed file. If the size of the new data is less than that of a complete chunk, then compression of the new data may be delayed until a complete chunk is available for compression, or the partial chunk may be compressed to form a compressed partial chunk that is stored in the compressed file. In this latter case, the original partial chunk may be cached so that additional data can be added to the partial chunk without having to perform decompression of the previously stored compressed partial chunk.

Figure 8:
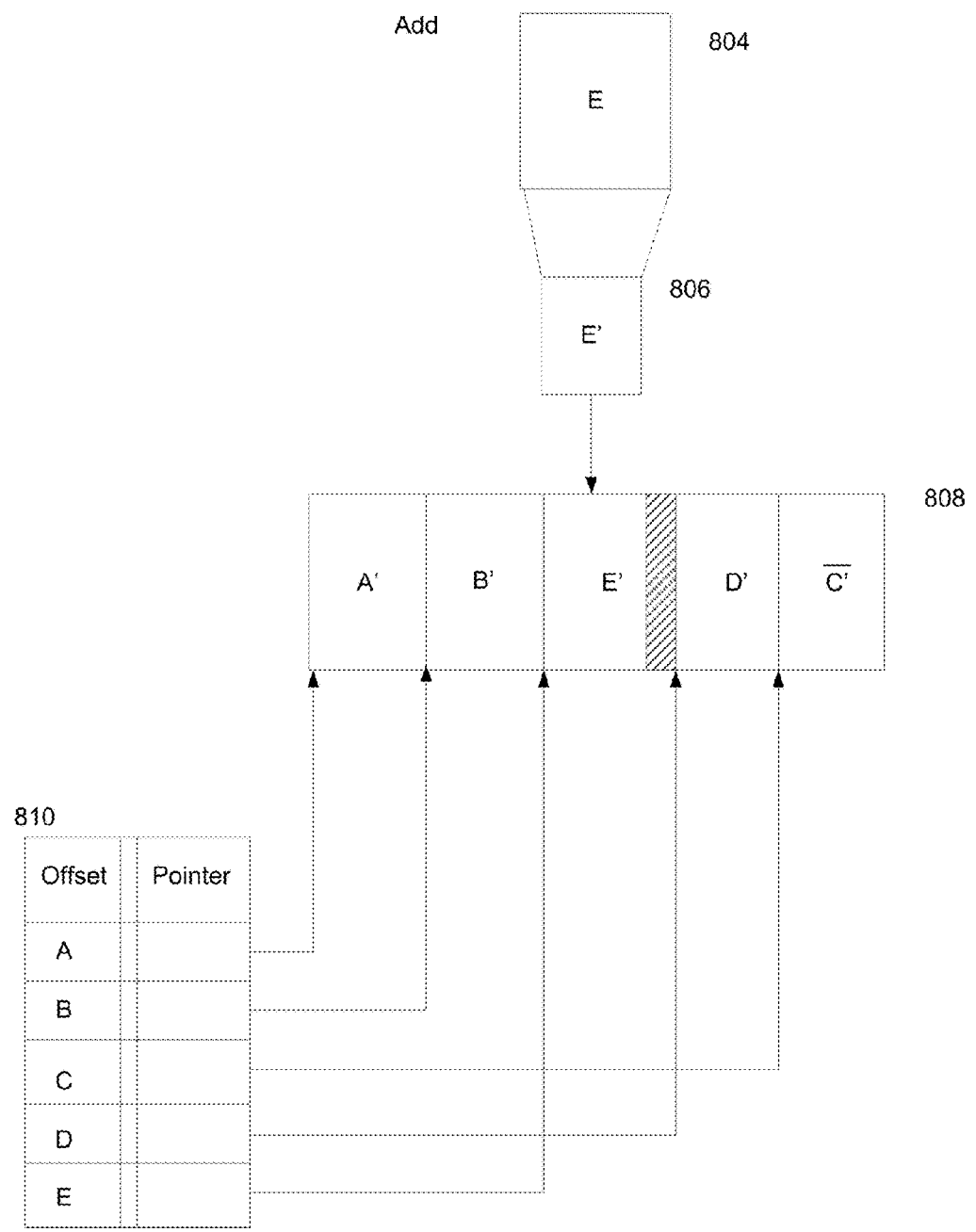
FIG. 8 is a schematic diagram showing addition of new data to a file, in accordance with an exemplary embodiment of the present invention.

When additional information is added to the compressed file, the additional information may be stored at the end of the compressed file or, if there is a sufficient amount of vacated space within the compressed file (e.g., as when compressed chunk C' was vacated from compressed file 709 as shown and described with reference to FIG. 7), may be stored within the vacated space. For example, as depicted in FIG. 8, when new data E 804 is added to the end of the original file (either in a single write or in a series of writes), the new data E 804 may be compressed at an appropriate time to form compressed chunk E' 806. If the size of compressed chunk E' 806 is less than or equal to the size of the space vacated by compressed chunk C', then the compressed chunk E' 806 may be inserted into that space so as to form compressed file 808, in which case the map is updated accordingly to result in the map 810. In this way, the compressed file 808 is the same size as the compressed file 709 but holds the enlarged original file.

It should be noted that compression for a given file may be enabled from the start such that the file is compressed as it is written, substantially as described above. The file initially may be created as an "empty" compressed file, i.e., containing no compressed chunks and optionally having an empty map. In any case, as data is written to the file, the data typically is compressed on a per-write basis and the corresponding compressed chunks added to the compressed file as described above, although data from a number of writes may be compressed substantially as shown and described with reference to FIG. 8. The map and/or the compressed chunk headers are updated accordingly.

In some embodiments, it may be beneficial for each entry in the map to map a fixed-size range of the original file (e.g., a 4K range) to one or more compressed chunks (e.g., the map might include a first pointer for file range 0 to (4K−1), a second pointer for file range 4K to (8K−1), and so on). As mentioned above, data may be compressed as it is written to the original file, and since writes can be of different sizes, a particular write may be larger or smaller than a fixed-size range or may span multiple ranges. For writes that are larger than a fixed-size range, it may be beneficial to compress the entire write into a single compressed chunk rather than divide the write into multiple chunks and compress the chunks separately (e.g., data compression schemes are generally more efficient when applied to a larger sample of data, and also for embodiments in which the compressed chunks include a header, having one header rather than multiple headers associated with a particular write can save space), so in such embodiments, multiple ranges may map to a single compressed chunk. For writes that are smaller than a fixed-size range or span across multiple ranges, a single range may be associated with multiple compressed chunks. Particularly in this latter case, pointers (for example, in the compressed chunk headers) may be used to link multiple compressed chunks that are associated with a single range.

Figure 9:
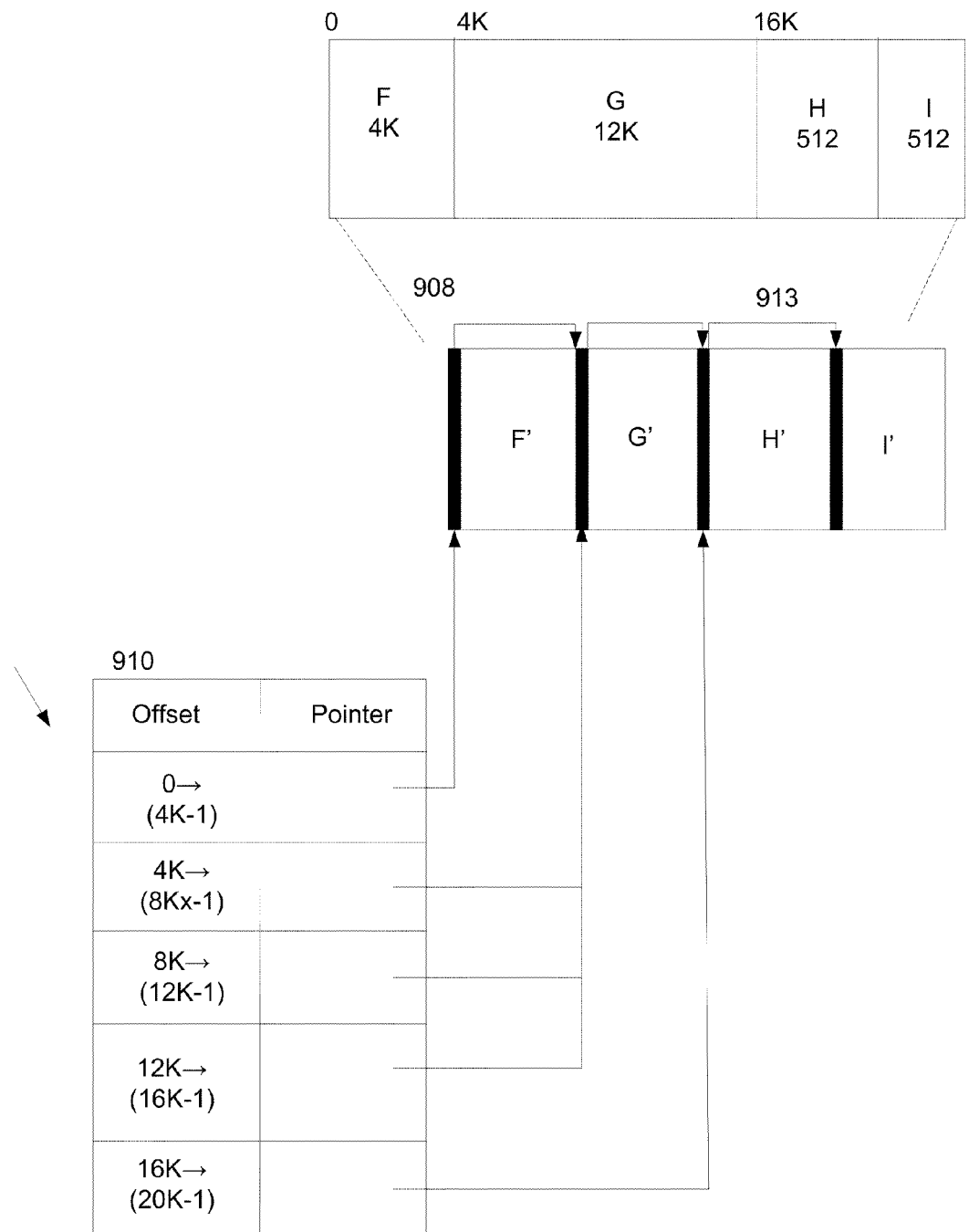
FIG. 9 is a schematic diagram for mapping fixed-sized ranges of the original file to compressed chunks, in accordance with an exemplary embodiment of the present invention.

FIG. 9 is a schematic diagram for mapping fixed-sized ranges of the original file to compressed chunks, in accordance with an exemplary embodiment of the present invention. In this example, there are four consecutive writes of 4K (chunk F), 12K (chunk G), 512 (chunk H), and 512 (chunk I) bytes, respectively. Each chunk is compressed to form a corresponding compressed chunk F', G', H', and I', respectively. In this example, the compressed chunks include headers (represented by a dark bar at the beginning of each compressed chunk). The compressed chunks are stored together as compressed file 908. Map 910 maps original file range 0->(4K−1) to compressed chunk F'; maps original file ranges 4K->(8K−1), 8K->(12K−1), and 12K- >(16K−1) to compressed chunk G'; and maps original file range 16K->(20K−1) to compressed chunk H'. The header of compressed chunk H' includes a pointer 913 to the beginning of compressed chunk I' (also, the header of compressed chunk F' may include a pointer to the start of compressed chunk G', and the header of compressed chunk G' may include a pointer to the start of compressed chunk H', as depicted in FIG. 9).

Now, if a request relates to data within the range, say, 8K->(12K−1), then based on the map 910, compressed chunk G' is retrieved and decompressed enough to recover the data needed to satisfy the request. It should be noted that the same would be true for requests relating to the range 4K->(8K−1) and also would be true for requests relating to the range 12K->(16K−1).

Similarly, if a request relates to data within the range 16K->(20K−1), then based on the map 910, compressed chunk H' is retrieved and decompressed, and if insufficient data is recovered to satisfy the request, then based on the pointer 913, compressed chunk I' is retrieved and decompressed at least enough to recover the data needed to satisfy the request. It should be noted that the map 910 does not include a pointer to compressed chunk I', but compressed chunk I' is accessed using the pointer 913 contained in the header of compressed chunk H'.

Figure 10:
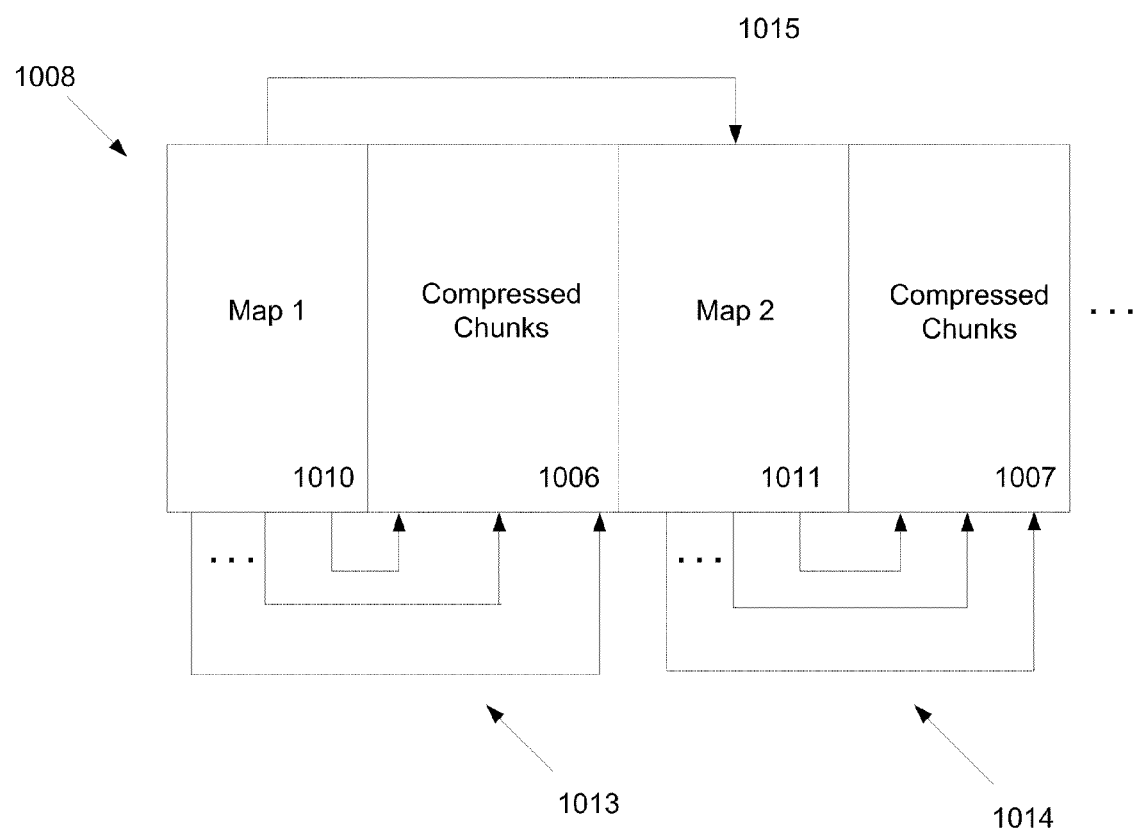
FIG. 10 is a schematic diagram of a compressed file 1008 with embedded maps in accordance with an exemplary embodiment of the present invention.
Figure 11:
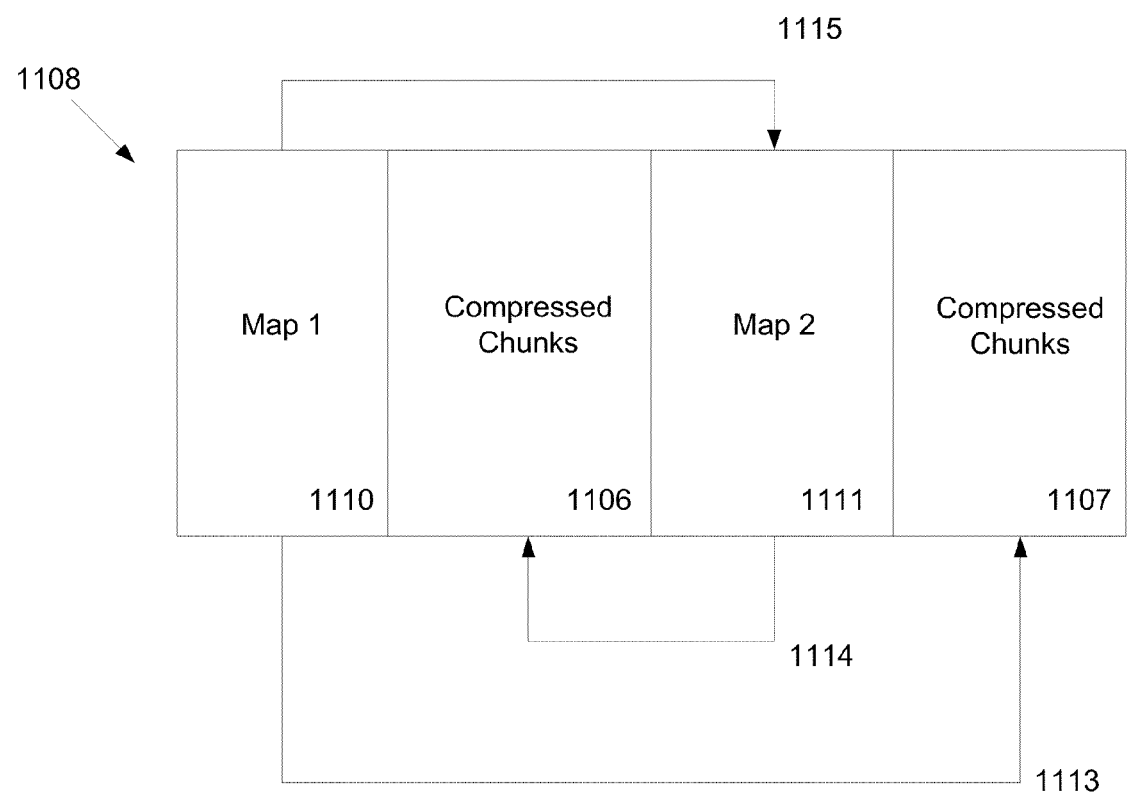
FIG. 11 is a schematic diagram of a modified compressed file 1108 in accordance with an exemplary embodiment of the present invention.

In certain embodiments, the compressed file may be associated with one or more maps that are stored within the compressed file itself. For example, an initial map may be placed at the beginning of the compressed file, for example, when the compressed file is first created, and additional maps may be added as needed to map original file data to compressed chunks. FIG. 10 is a schematic diagram of a compressed file 1008 with embedded maps in accordance with an exemplary embodiment of the present invention, in which the compressed file 1008 includes a first map 1010 with pointers 1013 to compressed chunks 1006 and a second map 1011 with pointers 1014 to compressed chunks 1007. In this example, each map includes a pointer to a "next" map within the compressed file (i.e., the first map 1010 includes a pointer 1015 to the second map 1011) to facilitate traversing the maps, although the maps could be located and traversed using other logic structures. It should be noted that, as the compressed file is modified over time (e.g., as compressed chunks are added to the end of the compressed file or to vacated locations within the compressed file), the map pointers are updated accordingly. FIG. 11 is a schematic diagram of a modified compressed file 1108 in accordance with an exemplary embodiment of the present invention, in which the first map 1110 includes a pointer 1113 to one of the compressed chunks 1107 and the second map 1111 includes a pointer 1114 to a compressed chunk 1106. As before, the first map 1110 includes a pointer 1115 to the second map 1111.

Alternatively, the map may be stored as a separate filesystem object, in which case the compressed file may contain a pointer to the object that stores the map, for example, within the root node of the compressed file.

It should be noted that terms such as "client," "server," "switch," and "node" may be used herein to describe devices that may be used in certain embodiments of the present invention and should not be construed to limit the present invention to any particular device type unless the context otherwise requires. Thus, a device may include, without limitation, a bridge, router, bridge-router (brouter), switch, node, server, computer, appliance, or other type of device. Such devices typically include one or more network interfaces for communicating over a communication network and a processor (e.g., a microprocessor with memory and other peripherals and/or application-specific hardware) configured accordingly to perform device functions. Communication networks generally may include public and/or private networks; may include local-area, wide-area, metropolitan-area, storage, and/or other types of networks; and may employ communication technologies including, but in no way limited to, analog technologies, digital technologies, optical technologies, wireless technologies (e.g., Bluetooth), networking technologies, and internetworking technologies.

It should also be noted that devices may use communication protocols and messages (e.g., messages created, transmitted, received, stored, and/or processed by the device), and such messages may be conveyed by a communication network or medium. Unless the context otherwise requires, the present invention should not be construed as being limited to any particular communication message type, communication message format, or communication protocol. Thus, a communication message generally may include, without limitation, a frame, packet, datagram, user datagram, cell, or other type of communication message.

It should also be noted that logic flows may be described herein to demonstrate various aspects of the invention, and should not be construed to limit the present invention to any particular logic flow or logic implementation. The described logic may be partitioned into different logic blocks (e.g., programs, modules, functions, or subroutines) without changing the overall results or otherwise departing from the true scope of the invention. Often times, logic elements may be added, modified, omitted, performed in a different order, or implemented using different logic constructs (e.g., logic gates, looping primitives, conditional logic, and other logic constructs) without changing the overall results or otherwise departing from the true scope of the invention.

The present invention may be embodied in many different forms, including, but in no way limited to, computer program logic for use with a processor (e.g., a microprocessor, microcontroller, digital signal processor, or general purpose computer), programmable logic for use with a programmable logic device (e.g., a Field Programmable Gate Array (FPGA) or other PLD), discrete components, integrated circuitry (e.g., an Application Specific Integrated Circuit (ASIC)), or any other means including any combination thereof. In a typical embodiment of the present invention, predominantly all of the described logic is implemented as a set of computer program instructions that is converted into a computer executable form, stored as such in a computer readable medium, and executed by a microprocessor under the control of an operating system.

Computer program logic implementing all or part of the functionality previously described herein may be embodied in various forms, including, but in no way limited to, a source code form, a computer executable form, and various intermediate forms (e.g., forms generated by an assembler, compiler, linker, or locator). Source code may include a series of computer program instructions implemented in any of various programming languages (e.g., an object code, an assembly language, or a high-level language such as Fortran, C, C++, JAVA, or HTML) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

The computer program may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device. The computer program may be fixed in any form in a signal that is transmittable to a computer using any of various communication technologies, including, but in no way limited to, analog technologies, digital technologies, optical technologies, wireless technologies (e.g., Bluetooth), networking technologies, and internetworking technologies. The computer program may be distributed in any form as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

Hardware logic (including programmable logic for use with a programmable logic device) implementing all or part of the functionality previously described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL).

Programmable logic may be fixed either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), or other memory device. The programmable logic may be fixed in a signal that is transmittable to a computer using any of various communication technologies, including, but in no way limited to, analog technologies, digital technologies, optical technologies, wireless technologies (e.g., Bluetooth), networking technologies, and internetworking technologies. The programmable logic may be distributed as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

The present invention may be embodied in other specific forms without departing from the true scope of the invention. Any references to the "invention" are intended to refer to exemplary embodiments of the invention and should not be construed to refer to all embodiments of the invention unless the context otherwise requires. The described embodiments are to be considered in all respects only as illustrative and not restrictive.

What is claimed is:

1. A method for storing a file by a file server in a file storage system, wherein the file is logically partitioned into chunks, the method comprising:
   compressing each chunk to form a corresponding compressed chunk;
   forming a compressed file including the compressed chunks;
   storing the compressed file in the file storage system; and
   maintaining mapping metadata for the compressed file, the mapping metadata mapping portions of the original file to corresponding compressed chunks in the compressed file, wherein compressing a chunk to form a corresponding compressed chunk includes generating a header for the compressed chunk, and wherein maintaining the mapping metadata comprises maintaining mapping metadata in the header including maintaining within the header a pointer to a sequentially next compressed chunk in the compressed file.

2. A method according to claim 1, further comprising:
   dividing a non-compressed file into chunks.

3. A method according to claim 2, wherein dividing the non-compressed file into chunks comprises:
   dividing the non-compressed file into nominally fixed-size chunks.

4. A method according to claim 1, further comprising:
   receiving write requests for the file, wherein each write request is treated as a separate chunk.

5. A method according to claim 1, wherein forming the compressed file comprises:
   maintaining mapping metadata within the compressed file.

6. A method according to claim 5, wherein maintaining mapping metadata within the compressed file comprises maintaining at least one map within the compressed file.

7. A method according to claim 5, wherein the compressed file includes a root node, and wherein maintaining the mapping metadata within the compressed file includes maintaining mapping metadata within the root node.

8. A method according to claim 1, wherein maintaining mapping metadata comprises at least one of:
   mapping each chunk to its corresponding compressed chunk; and
   mapping fixed-size ranges of the file to corresponding compressed chunks in the compressed file.

9. A method according to claim 1, further comprising maintaining compression metadata for the compressed file, the compression metadata including at least one of:
   a compression type for the compressed file;
   a compression type for each compressed chunk of the compressed file;
   a size for each chunk;
   a size for each compressed chunk; and
   an indicator for each compressed chunk indicating whether the compressed chunk contains compressed or uncompressed data.

10. A method for storing a file by a file server in a file storage system, wherein the file is logically partitioned into chunks, the method comprising:
    compressing each chunk to form a corresponding compressed chunk;
    forming a compressed file including the compressed chunks;

storing the compressed file in the file storage system; and
maintaining mapping metadata for the compressed file, the mapping metadata mapping portions of the original file to corresponding compressed chunks in the compressed file, wherein maintaining the mapping metadata comprises maintaining mapping metadata in a map file separate from the compressed file and maintaining a reference to the map file within the compressed file, and wherein storing a reference to the map file within the compressed file includes storing the reference within a root node of the compressed file.

11. A method according to claim 10, further comprising at least one of:
dividing a non-compressed file into chunks; and
receiving write requests for the file, wherein each write request is treated as a separate chunk.

12. A method according to claim 10, wherein maintaining mapping metadata comprises mapping each chunk to its corresponding compressed chunk.

13. A method according to claim 10, wherein maintaining mapping metadata comprises mapping fixed-size ranges of the file to corresponding compressed chunks in the compressed file.

14. A method according to claim 10, further comprising maintaining compression metadata for the compressed file, the compression metadata including at least one of:
a compression type for the compressed file;
a compression type for each compressed chunk of the compressed file;
a size for each chunk;
a size for each compressed chunk; and
an indicator for each compressed chunk indicating whether the compressed chunk contains compressed or uncompressed data.

15. A method for storing a file by a file server in a file storage system, wherein the file is logically partitioned into chunks, the method comprising:
compressing each chunk to form a corresponding compressed chunk;
forming a compressed file including the compressed chunks;
storing the compressed file in the file storage system;
maintaining mapping metadata for the compressed file, the mapping metadata mapping portions of the original file to corresponding compressed chunks in the compressed file; and
upon receiving a request relating to a portion of the original file:
identifying at least one compressed chunk associated with the portion of the original file using the map information;
retrieving each identified compressed chunk from the compressed file;
decompressing each retrieved compressed chunk sufficiently to recover original data associated with the portion; and
satisfying the requesting using the recovered original data, and when satisfying the request results in a modified chunk:
compressing the modified chunk to form a modified compressed chunk;
storing the modified compressed chunk as part of the compressed file such that when the size of the modified compressed chunk is less than or equal to the size of the corresponding compressed chunk retrieved from the compressed file, inserting the modified compressed chunk into the compressed file in place of the compressed chunk, and when the size of the modified compressed chunk is greater than the size of the corresponding compressed chunk retrieved from the compressed file, inserting the modified compressed chunk elsewhere in the compressed file; and
updating the mapping metadata to include the modified compressed chunk.

16. A method according to claim 15, wherein decompressing each retrieved compressed chunk sufficiently to recover original data associated with the portion comprises terminating decompression of a compressed chunk upon recovering a sufficient amount of original data for satisfying the request.

17. A method according to claim 15, further comprising at least one of:
dividing a non-compressed file into chunks; and
receiving write requests for the file, wherein each write request is treated as a separate chunk.

18. A method according to claim 17, wherein forming the compressed file comprises maintaining mapping metadata in the compressed file.

19. A method according to claim 15, further comprising recovering unused space within the compressed file.

20. A method according to claim 19, wherein recovering unused space within the compressed file comprises:
decompressing the compressed file; and
recompressing the compressed file.

21. A method according to claim 15, wherein maintaining mapping metadata comprises at least one of:
mapping each chunk to its corresponding compressed chunk; and
mapping fixed-size ranges of the file to corresponding compressed chunks in the compressed file.

22. A method according to claim 15, further comprising maintaining compression metadata for the compressed file, the compression metadata including at least one of:
a compression type for the compressed file;
a compression type for each compressed chunk of the compressed file;
a size for each chunk;
a size for each compressed chunk; and
an indicator for each compressed chunk indicating whether the compressed chunk contains compressed or uncompressed data.

* * * * *